US007995591B2

(12) United States Patent
Civanlar et al.

(10) Patent No.: US 7,995,591 B2
(45) Date of Patent: Aug. 9, 2011

(54) SIP2 MOBILE GATEWAY (75) Inventors: Seyhan Civanlar, Istanbul (TR); Hanife Senol, Istanbul (TR); Tulay Sazak, Istanbul (TR); Can Ozpak, Istanbul (TR); Esra Ozlem Sakar, Istanbul (TR); Can Ozumuztoprak, Istanbul (TR); Burak Gorkemli, Istanbul (TR); Adnan Burak Gurdag, Istanbul (TR); Ertan Onur, Istanbul (TR); Erhan Lokman, Istanbul (TR); Altug Simsek, Istanbul (TR); Gurkan Gur, Istanbul (TR); Aziz Sever, Istanbul (TR)

(73) Assignee: Argela Yazilim ve Bilisim Teknolojileri San. ve Tic. A.S. (TR)

( * ) Notice: Subject to any disclaimer, the term of this patent is extended or adjusted under 35 U.S.C. 154(b) by 1082 days.

(21) Appl. No.: 11/764,941

(22) Filed: Jun. 19, 2007

(65) Prior Publication Data
US 2007/0243891 A1 Oct. 18, 2007

Related U.S. Application Data (63) Continuation of application No. 11/071,233, filed on Mar. 4, 2005, now Pat. No. 7,254,137.

(51) Int. Cl.
*H04L 12/28* (2006.01)
*H04J 3/22* (2006.01)
(52) U.S. Cl. ........................................ 370/401; 370/467
(58) Field of Classification Search .................. 370/310, 370/328, 338, 400, 464–467; 455/554.2, 455/426.2; 379/219, 220.01, 221.09
See application file for complete search history.

(56) References Cited

U.S. PATENT DOCUMENTS

| 5,745,850 | A | 4/1998 | Aldermeshian et al. |
|---|---|---|---|
| 6,181,935 | B1 | 1/2001 | Gossman et al. |
| 6,741,695 | B1 | 5/2004 | McConnell et al. |
| 6,968,205 | B2 | 11/2005 | Burnham |
| 2002/0068529 | A1 | 6/2002 | Knoble |
| 2004/0095945 | A1 | 5/2004 | Woog |
| 2004/0235500 | A1 | 11/2004 | Dombkowski et al. |
| 2004/0235518 | A1 | 11/2004 | Beyette et al. |
| 2004/0266478 | A1 | 12/2004 | King et al. |
| 2005/0117602 | A1 | 6/2005 | Carrigan et al. |

*Primary Examiner* — Kerri M Rose
(74) *Attorney, Agent, or Firm* — IP Authority, LLC; Ramraj Soundararajan (57) ABSTRACT A system and method for using an IP client attached to the Public Internet, acting as a virtual mobile terminal such as a cell phone, to have full access to mobile telephony services offered by a mobile operator using a SIP2 Mobile gateway. The services include a mobile telephone number, capabilities of sending and receiving short messages and mobile intelligent services such as prepaid billing, number translation, and ring back tones.

18 Claims, 5 Drawing Sheets

SIP2 MOBILE GATEWAY

RELATED APPLICATIONS

This application is a continuation of U.S. application Ser. No. 11/071,233, filed Mar. 4, 2005.

BACKGROUND OF THE INVENTION

1. Field of Invention

The present invention relates generally to the field of telephone services. More specifically, the present invention relates to accessing mobile network voice services from an IP client.

2. Discussion of Prior Art

Figure 1:
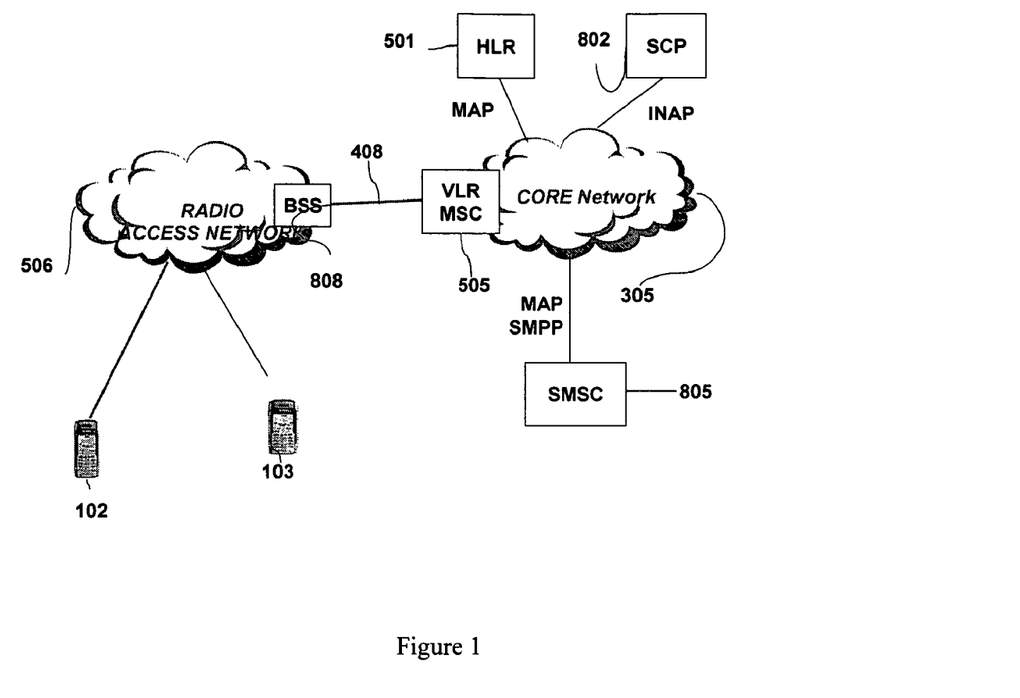
FIG. 1 illustrates a prior art Mobile Operator Network.

A mobile operator's network also known as a Public Land Mobile Network (PLMN) typically comprises a universal terrestrial radio access network (UTRAN) and a circuit switched wire-line core network as illustrated in FIG. 1. The UTRAN carries the radio signals from the cell phones to the core network and back. The core network determines the location of mobile users and performs the required switching and service delivery functions using circuit switched or packet based core switches to route calls. The Third Generation (also known as 3G) networks describe a packet switched core network as an alternative to traditional Second Generation (2G) circuit switched core networks.

Referring to FIG. 1, the universal radio access network, UTRAN, 506 carries the radio frequency (RF) signals from the wireless cell phone 102 to the switches that form the mobile operator's core network 305. A UTRAN may use Time Division Multiple Access (TDMA) or Code Division Multiple Access (CDMA) for handling RF signals. A UTRAN base station system (BSS) 808 communicates with cell phone 102 using allocated radio frequencies, and using Base Station System Application Part (BSSAP) protocol or other similar protocols, it sends location information about the mobile user 102 to the Mobile Switching Center (MSC) 505, which is a key component of the core network 305. The core network 305 comprises many MSCs and facilities that interconnect them.

There is a functionality embedded within the MSC known as Visitor Location Register (VLR), which retrieves information about the location of mobile user 102, stores it locally, and updates the centralized register known as Home Location Register (HLR) 501 using Mobile Application Part (MAP) protocol or other similar protocols. Doing so, the centralized HLR has up to date knowledge about which VLR/MSC each mobile user is currently attached to while they roam. Protocols such as MAP are specifically defined for GSM networks and considered to be part of SS7 signaling, but there are equivalent protocols in other types of networks, all defined by proper standards bodies (ETSI, ANSI etc.).

If mobile user 103 initiates a phone call to mobile user 102, it first reaches VLR/MSC 505 or the MSC to which mobile user 103's BSS connects to (in this scenario it is the same VLR/MSC as the one user 102 attaches to) so as to obtain location information about user 102. If the location of user 102 is in the local database of the VLR, then that MSC can process the call. Otherwise, it initiates a Mobile Station Roaming Number (MSRN) request using MAP protocol to HLR 501 to learn which MSC the user 102 is attached to. Such a request also allows the HLR to send other information about subscriber's services to the MSC. The HLR stores subscriber service information as well as subscriber location. The subscriber service information is provisioned into the HLR using a provisioning system. If the HLR sends information about the services associated with the caller 103 or called 102 (such as prepaid billing, or number translation), the VLR/MSC sends an Intelligent Network Application Protocol (INAP) request to Service Control Point (SCP) 802 for instructions to handle a call that has associated intelligent or supplementary services. In prior art, the SCP 802 is where subscriber's services are processed. In response to the INAP message, SCP 802 may contact local databases to perform appropriate address translations, or may contact the billing system for a prepaid charging request. For services such as prepaid, SCP 802 maintains the call state during the call in order to deduct appropriate amounts from user 103's prepaid billing account until the call terminates.

The VLR/MSC 505 uses ISDN User Part (ISUP) signaling protocol towards the other switches in the network for call path establishment. The HLR may be provisioned manually or automatically with subscription based services. The SCP may also be configured manually or electronically for processing the calls for service delivery. All these components and service delivery steps are prior art and well understood.

During the last decade, the Internet Engineering Task Force (IETF) has developed protocols to carry voice along with data on IP networks. Recently, millions of people have started using the Internet for voice in addition to data. Although phone calls may originate on a terminal attached to the Internet, because the called party will most likely be attached to a non-IP (legacy) network (mobile or fixed networks), a translation gateway is needed to bridge Internet telephony to legacy telephony both for signaling and bearer translations. This translation gateway is known in prior art as a softswitch.

In the softswitch approach, the calling party subscribes to services of a Voice over IP (VoIP) operator (such as Net2Phone® or Vonage®), who has a private Internet backbone, which is also attached to the public Internet to allow access from the public Internet, and has interconnectivity to other operators network to have access to users on other operator's circuit switched network. The softswitch is most commonly owned by the VoIP operator and has interface with mobile or fixed networks.

Figure 2:
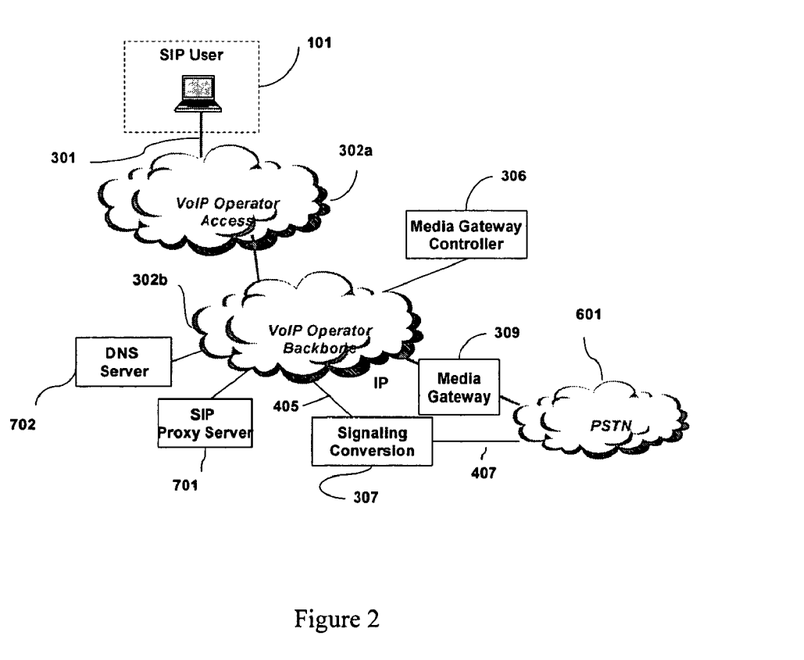
FIG. 2 illustrates a prior art VoIP Operator Network.

In order to contrast the above operations with that of the fixed environment, a VoIP operator's (such as Vonage® or Net2Phone®) network is shown in FIG. 2. The Session Initiation Protocol (SIP) as described in RFC 3261 may be used as a VoIP signaling protocol. In FIG. 2, the VoIP terminals 101 that can make phone calls are referred as "SIP clients". It does not preclude, however, that the client may use another IP telephony protocol.

In prior art, the VoIP Operator's network comprises a fixed access network 302a, a fixed core network 302b and at least one softswitch, which is attached to both the VoIP operator's IP network, and simultaneously, to the circuit switched Public Switched Telephony Network (PSTN). The access network may use dial, fixed wireless, cable, ADSL, private line or other narrowband or broadband technologies depending on VoIP operator's choice. In some cases, the VoIP operator may not have an access network. Meaning they rely on the Internet Service Provider's access network to offer the service. For example, if a cable operator such as Comcast® is the VoIP operator, they use the cable network they own to deliver cable TV service for VoIP, and they use an IP backbone network. Another example VoIP operator is Vonage® who does not own an access network, and simply uses the internet access that an ADSL or Cable Operator such as Comcast® delivers to home. In this scenario, Vonage® provides an access box from Motorola that provides a connection to the internet at home and the telephone on another termination to make phone calls.

The VoIP operator's attachment to the PSTN can be performed via connecting to one of the telephone service provider. Connecting to one provider, in general, provides access to many other operators' network through that provider's interconnectivity agreements with other operators and physical connectivity. The softswitch components are prior art and hence will not be discussed in detail in this application. When SIP client 101 attaches to VoIP operator 302's network and calls a phone client attached to the PSTN 601, the SIP signaling originated in SIP Client 101 is terminated on SIP Proxy server 701 in VoIP operator's network or it may alternatively be embedded with softswitch.

Softswitch performs the appropriate signaling translations between IP to SS7/ISUP telephony signaling, translations between IP voice bearers to circuit switched voice bearers, and other well-known functions such as control of the Media Gateway subcomponent of the softswitch using Media Gateway Control Protocol (MGCP) or other protocols. All these components and protocols are well defined in prior art.

If the called party in this scenario is a mobile terminal, then the routing to the appropriate VLR/MSC is performed simply by the interconnection between the PTSN telephony operator and the PLMN. If the called or calling party has subscription-based services, then SCP 802 provides the needed functionality using either the SIP protocol or the INAP protocol between the Softswitch and the SCP.

From the service delivery perspective, the SIP client is a subscriber of the VoIP operator. Hence, the client has access to only the services that the VoIP operator provides. The SIP client's telephone number is provided by the VoIP operator who has a numbering pool.

The SIP client is attached to a fixed network operator. In the case of a subscriber of a VoIP operator initiating a voice call from his/her PC 101 attached to the public Internet 301 at a hotel lobby or Internet cafe, the SIP client of the PC connects to the VoIP operator's network 302. The SIP protocol requires a "SIP proxy server" 701 to intercept and process the SIP calls for signaling. The SIP client on PC 101 has to find the SIP proxy in the VoIP operator's network 302 to process the call. The SIP client finds the IP address of such a SIP proxy by querying the Domain Name Services (DNS) 702 using its SIP domain name as the handle. The SIP client performs the DNS lookup to receive the IP address corresponding to the SIP domain name of the SIP proxy server 701. Having the IP address, the SIP client can now connect to the SIP proxy server 701 in the VoIP operator's network 302 which can further process the phone call. The SIP proxy routes the call to a signaling gateway 307 which can communicate with the SIP protocol on one hand within the IP network and with the SS7 signaling protocol with the non-IP networks on the other. These are links 405 (SIP) and 407 (SS7) respectively. Doing so, the signaling path can be extended to the circuit switched network to find the called party which is on that network. Once the signaling is completed, the voice calls get routed from the calling party to the called party by first traveling the IP network if the form of RTP packets and then through a media gateway 309 which translates the RTP packets to circuit switched voice traffic and finally through the mobile operator's circuit switched network to reach the called party attached to it. The media gateway 309 is controlled by media gateway controller 306 using protocols such as MGCP (multimedia gateway control protocol) and MEGACO (media gateway control). The totality of components 306, 307, and 309 along with SIP Proxy Server 701 is sometimes referred in prior art a "softswitch".

Unfortunately, none of these solutions have an ability to offer seamless services to the users. Today, users cannot utilize their services in mobile networks from the Internet, and even more importantly they have to carry the burden of maintaining different telephone numbers, accounts and services on different networks. Simply, softswitch brought convergence in the networking layer, but not in the services layer.

Whatever the precise merits, features, and advantages of the above discussed systems, none of them achieves or fulfills the purposes of the present invention.

SUMMARY OF THE INVENTION

A system and method for initiating a phone call, a short messaging service or a multimedia messaging service between an IP client and another client attached to a mobile or wire-line network such that the IP client is a mobile client of a mobile operator with all features and functionalities of a cellular phone. A SIP2 Mobile gateway handles the mobility aspect of the IP client and subscriber services so as to make the IP client behave like a mobile client of a mobile operator providing these services.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

In the present invention, a mobile operator has both a radio access network for mobile user and Public Internet access for an IP client. The Session Initiation Protocol (SIP) as described in RFC 3261 may be used as a VoIP signaling protocol. It does not preclude, however, that the client may use another IP telephony protocol such as H.323.

Figure 3:
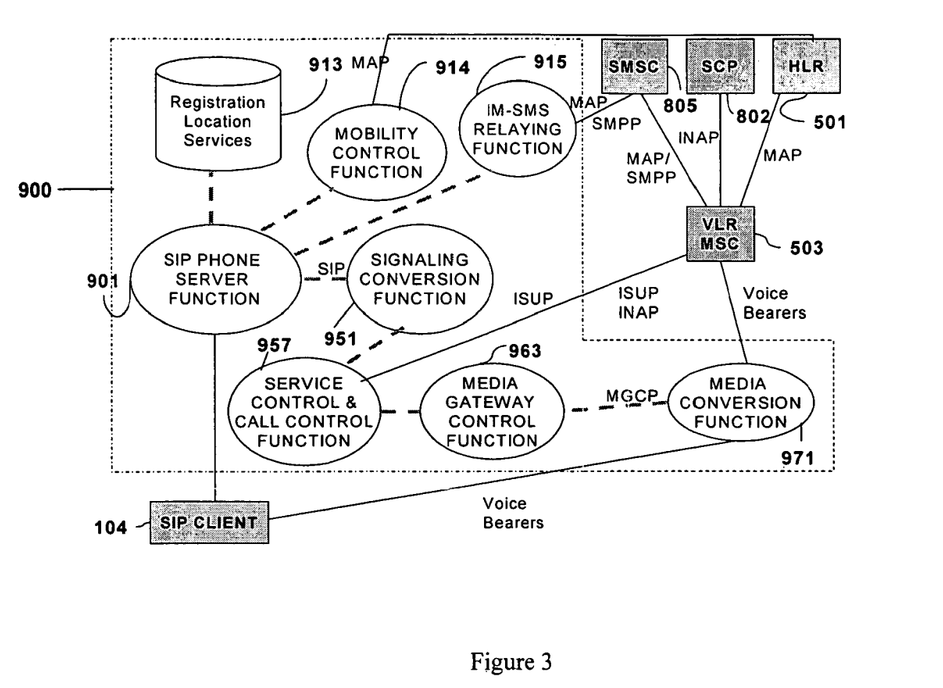
FIG. 3 illustrates the SIP2 Mobile Gateway Components, as per the present invention.

Per an aspect of this invention, SIP client 104 as shown in FIG. 3 has a mobile telephone number and has services from the mobile operator. These services are the same as those offered to users who have mobile terminals.

The SIP2 Mobile Gateway 900, as per a preferred embodiment of the invention, is a software adjunct to a traditional softswitch providing additional capabilities, which enable the mobility aspect of the terminal. These adjunct capabilities are comprised of:

Handling of mobility just like a VLR/MSC (but, a subset of a VLR/MSC's functions)

Handling of subscriber services to make the SIP client behave just like a mobile client (i.e. virtual mobile client) with services from that mobile operator.

The SIP client 104 is a subscriber of the mobile operator. In this embodiment, the SIP client has a mobile number, a number which is the same number as the cell phone number of that subscriber, it uses the same prepaid account of the user's cell phone and all other services associated with that cell phone number. Alternatively, the SIP client has an alias mobile number, which maps into the subscriber's cell phone number.

When SIP client 104 attaches to the Public Internet (via a browser on the mobile operator's web page) or a special client application that runs on a terminal, it first finds the phone server 901, an application running on the softswitch component of the SIP2 Mobile Gateway. The phone server 901 authenticates the user 104 using the user's telephone number and a password using a registration database running on SIP2 Mobile Gateway or using an external database.

Once the SIP client user is authenticated, the SIP2 Mobile Gateway acts as a VLR, and sends a location update message to the HLR of the operator to declare the location of SIP client 104. This is needed particularly because the SIP client has the same number of a mobile client and the location information about the whereabouts of that client is needed by the mobile network. In a MAP message towards the HLR, SIP2 Mobile Gateway uses it's own mobile number to proxy the SIP client's location. Meaning, the SIP2 Mobile Gateway will be the mobile end-point receiving phone calls directed to the SIP client's mobile number. In turn, the SIP2 Mobile Gateway will send the signaling and bearers to the SIP client 104 using the public internet. Although the SIP2 Mobile Gateway may simply handle mobility and service functions, it may additionally have all the features of a softswitch. If the SIP2 Mobile gateway does not have softswitch functions, it delegates the signaling and bearer translations to a softswitch it attaches to.

In FIG. 1, mobile user 102 can make a phone call through the Radio Access Network 506 via BSSAP protocol 408 and then mobile switching center 505 switches this call towards the called party. Although the core mobile network and resources are valuable, the limited resources in the radio access network become the limiting factor for the operators to increase their user base and revenues. As a side note, many operators are looking to solve this problem using compression solutions to utilize the air resources in the radio access network in a more efficient way.

The system of the present invention distinguishes itself by not only using the Internet as the alternative access network, but also by using the same services the user gets through its mobile operator. This invention is also the key enabler to generate extra revenue by means of increased minutes through Internet use for access. The following describes a few example cases where the SIP client is used per this invention.

Use Case 1: Solving International Roaming Problem

In prior art, when mobile users travel abroad they can continue to use their cell phones to make phone calls or to use short messaging service (SMS) or multimedia messaging service (MMS) if the home operator has set interconnect or roaming agreements with other operators internationally. These voice or data calls are treated at international minutely rates set between the international operator and the home (domestic) operator, from whom the user has the national service. These rates are usually cost prohibitive causing the users not to make international phone calls unless it is absolutely necessary or only if their enterprise is paying for it. This situation causes "lost minutes" and hence "lost revenues" to the home operator when their users travel abroad for leisure or business. By deploying the SIP2 Mobile Gateway, the mobile operator allows the mobile users who travel to use the Public Internet to make phone calls to their home network and receive phone calls as if they are using their mobile phones.

Use Case 2: Solving FCT (Fixed Cellular Terminal) Problem

Many phone calls originating from a PBX in an enterprise are calling mobile phone numbers. Mobile operators provide incentive for cell-phone-to-cell-phone dialing by providing substantial rate reductions. Therefore, it is more advantageous to originate calls on a PBX destined to a mobile number from a mobile number on that PBX. In prior art, the FCT performs this function. It is attached to the PBX and the mobile radio network. When a caller's call arrives at the PBX, the PBX checks if the called number is a mobile number recognized by the prefix of that number, and if the called number is a mobile number, then it routes the call to the FCT so that it originates from the FCT's mobile number. One of the key challenges of an operator is to manage thousands of expensive Fixed Cellular Terminal (FCT) bases installed on PBXs. Unfortunately these FCTs erode the precious radio access network resources of the mobile operator.

A SIP client, which has a mobile number from the mobile operator's numbering pool, is deployed on the PBX. Alternatively, the SIP client may be on another box attached to the PBX just like the FCT. The SIP client is attached to the Public Internet. When a mobile number is called, just like routing the call to the FCT, the call gets routed to the SIP client, which emulates a mobile client (with a mobile number and mobile account). The call gets routed to the SIP2 Mobile Gateway at the mobile operator's network in which case the operator treats the call originating from the SIP client as a mobile call. Doing so, the SIP client behaves as an FCT with the exception that the access network is the Public Internet and not the radio access network. The SIP2 Mobile Gateway directly connects to the core switches of the mobile operator.

Referring back to FIG. 3, the SIP2 Mobile Gateway 900 is comprised of several subsystems, which are grouped together to deliver different types of capabilities. Each of the subsystems is also usable as an individual component (not just as a part of the whole).

In one possible embodiment of SIP2 Mobile Gateway, it can be an adjunct to a softswitch. In another embodiment, the SIP2 Mobile Gateway may include all softswitch functionalities as well. The key functionalities are grouped into subsystems as follows:

SIP Phone Server Function (SPSF)
    SIP Register Server
    SIP Proxy Server
    SIP Redirect Server
    DNS Server
    Radius Server
Registry, location and services database (RLS DB)
Signaling Conversion Gateway (SCF)
    Conversions between SIP and ISUP
Media Conversion Gateway (MCF)
    Conversion between IP voice to circuit-switched voice
Media Gateway Control Function (MGCF)
    Media Conversion Gateway control functions
Service Control and Call Control Functions (SC & CCF)
    Communication functions with the SCP
    Generic call control functions
Mobility Control Function (MCF)
    MAP communications with the HLR
    Other protocol communications with the HLR
IM-SMS Relaying Function (IMRF)
    MAP/SMPP communications with the SMSC SIP Client: Although there are many different protocols and standards in prior art for VoIP clients, the type of client most accepted by the standards bodies is the Session Initiation Protocol (SIP) client (refer to RFC 3261). The SIP protocol defines the signaling and transport of a voice call originating from a SIP client to another SIP client or SIP server.

The SIP client 104 may reside on a personal computer (PC), a Palm Pilot, a Blackberry RIM®, a GPRS-enabled cell phone or another device which is attached to the public Internet via a fixed connection (such as cable or ADSL), a wireless connection (such as a Wi-LAN) or a mobile data connection (such as GPRS). SIP client 104, may also be a client embedded into the PBX, or a client integrated in a mobile operator's web page through an authentication page, which allows the browser to identify the user.

SIP Phone Server Function (SPSF) 901: These are standalone SIP servers, which include SIP proxy, register, radius, and DNS servers, which enable Voice over IP service. The SIP client is provisioned with the SPSF's proxy server name or IP address or it can dynamically obtain it from the DNS server. The SIP client-server communications can be performed over special IP tunnels to pass through firewalls and NATs. Additionally a DNS server can be utilized which can perform the appropriate name to address translations. The radius server enables SIP client registration and authentication. The SPSF is where the signaling messages coming from a SIP client is terminated. The SPSF may be Session Initiation Protocol (SIP) proxy server or SIP redirect server or an H.323 gatekeeper.

Registry, location and services database (RLS DB) 913: The RLS contains data about each mobile subscribers registration information, services and location. It has the registration information of each user (e.g. telephone number, domain name, password, etc. . . . ) for authentication of the SIP Client 104. Additionally, it contains all the subscriber services (such as call forwarding, VPN, ring-back-tone etc.). This database also maintains the location of each SIP client in the form of an IP address, and if needed the SIP2 Mobile Gateway it is serviced by.

IM-SMS Relaying Function (IMRF) 915: This subsystem provides all the signaling, translation, and bridging functions for Instant Messages. It translates SIP "MESSAGE" into mobile Short Message to send this message to the Short Message Service Center (SMSC) 805 by using MAP or SMPP protocol.

Signaling Conversion Function (SCF) 951: This subsystem provides all the signaling, translation, and bridging functions, except media. It translates SIP messages into ISUP signaling messages and vice versa, and sends ISUP messages to the SS7 portion of mobile network to handle voice calls. Special processing of Internet originating messages would be possible by inserting appropriate service information through ISUP messages. It also provides the Instant Messaging to/from SMS conversion to bridge text messages between the IP network and the mobile network. Additionally, bearer control and call control functions of the Media Gateway are integrated with this component.

Service Control and Call Control Functions (SC&CCF) 957: All the sessions between Internet and mobile network are maintained and service triggers are handled. Call and Service Control shall be capable to handle pure INAP and Call Control Service related messages and to establish connectivity to SCP 802 to deliver services to the user. Call and Service Control queries SCP 802 for service filtering and processing so that it communicates with service delivery systems. Communications with SCP may be carried out via SIP protocol, INAP protocol, CAMEL protocol or PARLAY APIs. It sends the MGCF 963 appropriate messages for the control of the bearers.

Media Gateway Control Function (MGCF) 963 and Media Conversion Gateway (MCF) 971: The gateway intercepts the RTP traffic and converts them to circuit switched voice and puts them on E1 trunks and vice versa by performing appropriate voice encoding/decoding, echo suppression, and other typical media gateway functions. Media Gateway control function is performed by the MGCP or MEGACO protocol.

Mobility Control Function (MCF) 914: This is one of the new key functions, which provides the interaction between the SIP2 Mobile Gateway and the HLR 501 to provide the location of SIP client to the mobile network. Note that this emulates the function of a VLR in a typical mobile network. However, since the SIP client does not use the radio access network and the known methods to update the HLR, SIP2 Mobile Gateway needs to directly reach the HLR and provide the needed updates.

The Internet user has to be authenticated while registering himself to the SIP Server Complex. The authentication process performs a data dip into the subscriber database to compare the user entered telephone number and password with the one stored in the user database.

Figure 4:
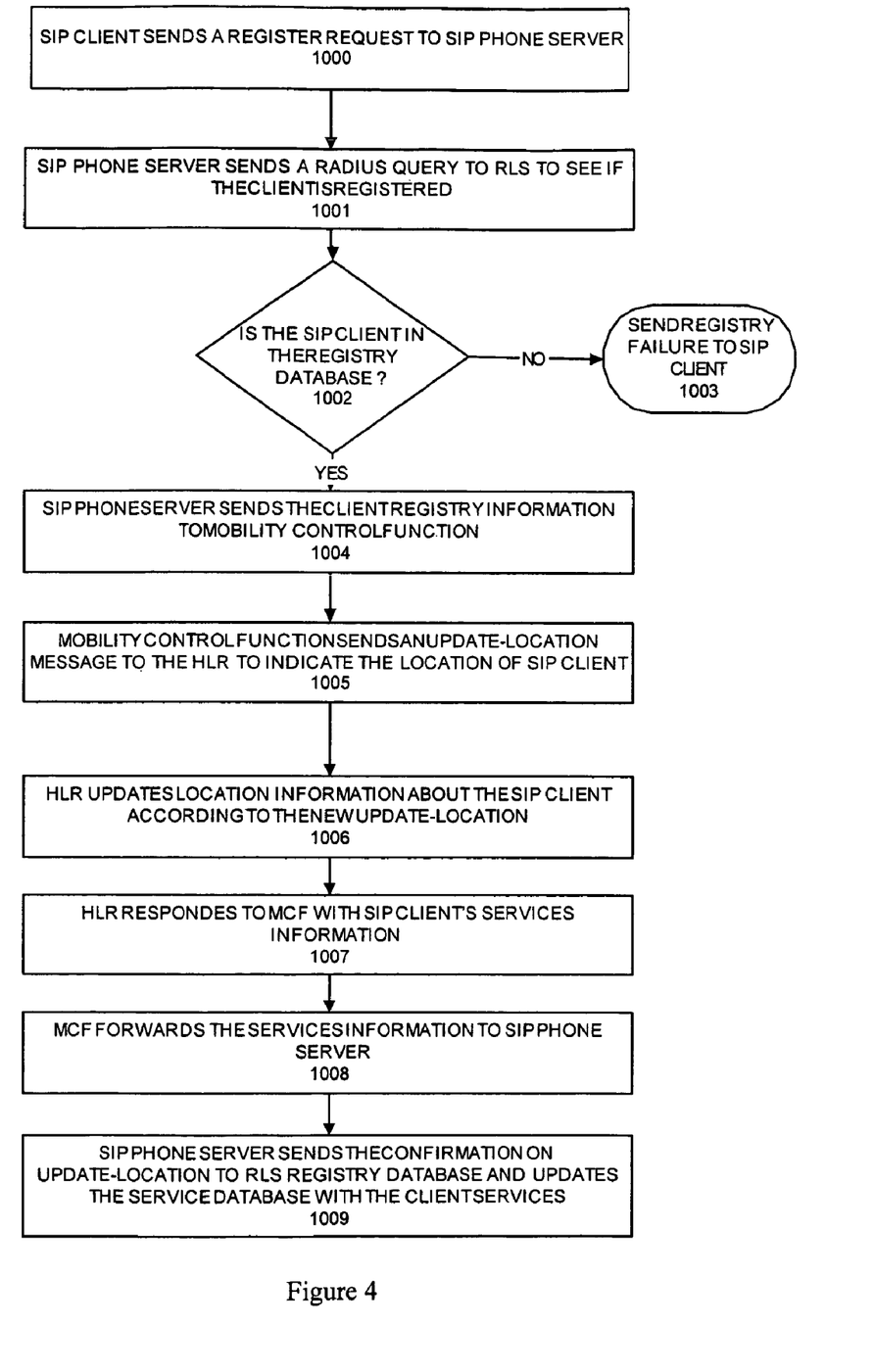
FIG. 4 illustrates a flow chart showing the SIP Client Registration Process., as per the present invention

Registration Scenario with Location Update:

FIG. 4 shows a flow chart illustrating the steps performed during registration phase of SIP client. In step 1000, SIP client first sends a SIP REGISTER (per RFC 3261) message to the SIP Phone Server Function (SPSF) 901, when a SIP client 104 is connected to the Public Internet. Either the IP address of the SPSF 901 is configured on the client, or it finds the IP address of SPSF by interrogating the DNS server. In step 1001, the SPSF 901 parses the SIP REGISTER message, and sends the message to the SIP proxy server subcomponent of SPSF 901, which in turn sends it to the SIP Registry server subcomponent of SPSF 901, which further sends a RADIUS request to the Registry database of Registry, Location and Services (RLS) database function 913. If the SIP client's mobile phone number is found in the database (step 1002), and if the SIP client 104 can properly authenticate itself with SPSF 901, the SIP Registry server sends the IP address of the SIP Client 104 to the Location Database, a subcomponent of RLS 913. Upon including the IP address and the phone number of the SIP client into the Location Database, the SPSF initiates a "location update" request towards the Mobility Control Function (MCF) 914, in step 1004. In step 1005, MCF generates the appropriate MAP location update message using the mobile phone number of the SIP client as the originator and sends it to VLR/MSC 503 to which the SIP2 Mobile Gateway is attached, which in turn forwards the MAP message towards the HLR 501 located in Mobile Core Network. In step 1006, the HLR in turn stores the location of SIP client as the VLR/MSC 503, and responds to the location update with the services to which the mobile phone number of the SIP client subscribes, in step 1007. In turn, the VLR/MSC 503 relays the location update response message back to the MCF 914. If the MCF receives information about the services of SIP client 104, it forwards the services information to the SIP phone server 901 in step 1008. In step 1009, the SIP phone server 901 further sends a confirmation on the location update to the RLS registry database and stores the information about these services into the Services Database subcomponent of RLS 913.

Figure 5:
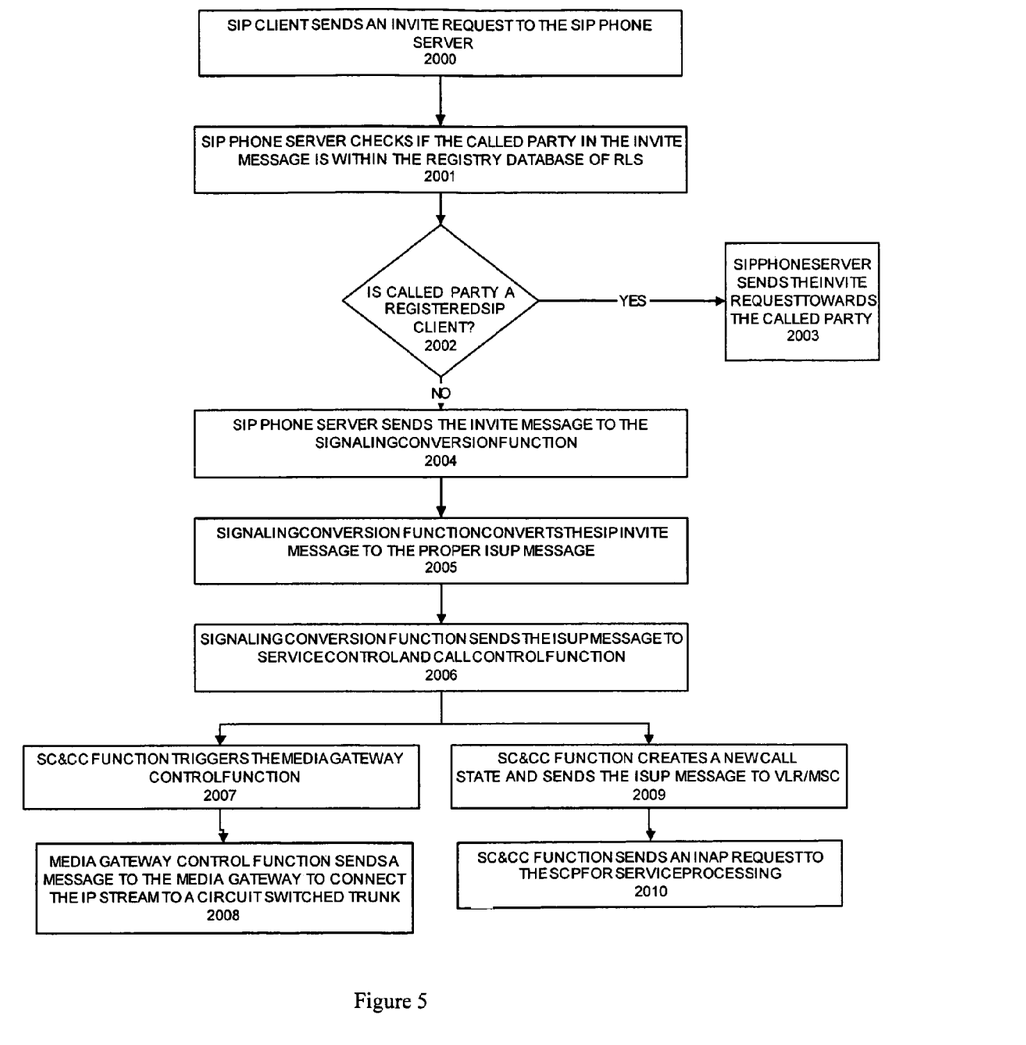
FIG. 5 illustrates a flow chart showing the SIP Client to Mobile Client Call Flow, as per the present invention.

SIP Client Calling a Mobile Number Scenario:

After the SIP client is registered as described above, the HLR 501 has the location of the mobile phone number corresponding to the SIP client. Additionally, the RLS 913 is aware of all services the SIP Client's mobile number subscribed to. FIG. 5 shows a flow chart illustrating the steps performed when SIP client initiates a call towards a mobile subscriber. In step 2000, the SIP Client 104 initiates a call towards a mobile client such as client 103 in FIG. 1 using the SIP INVITE message. In step 2001, this message is intercepted in SPSF 901 just as in the case of the Registration scenario above. The SPSF 901 parses the message and in step 2002, sends it to the RLS 913 to check if the called number 103 is a registered SIP client also. If the answer is yes, then in step 2003, it sends the INVITE message towards SIP client 103. If the called number 103 is not found in the RLS database, then in step 2004, the SPSF sends the INVITE message to the Signaling Conversion Function (SCF) 951, which maps the INVITE message to the appropriate ISUP message, in step 2005. In step 2006, the SCF 951 communicates the ISUP message with SC&CCF 957, which starts a new call state within the Call Control function while sending the ISUP message to VLR/MSC 503 in step 2009. In step 2010, it also sends an INAP message towards the SCP 802 responsible for the services of the SIP client's mobile number. While the call's intelligent service processing is done in the SCP 802, in step 2007, the Call Control function communicates with the Media Gateway Control Function 963, which in turn sends an MGCP message to the Media Gateway Function (MGF) 971 to connect the IP traffic into a particular trunk group of the Media Gateway which is attached to MSC 503 in step 2008. The rest of the ISUP and INAP messaging within the network follow the prior art.

Figure 6:
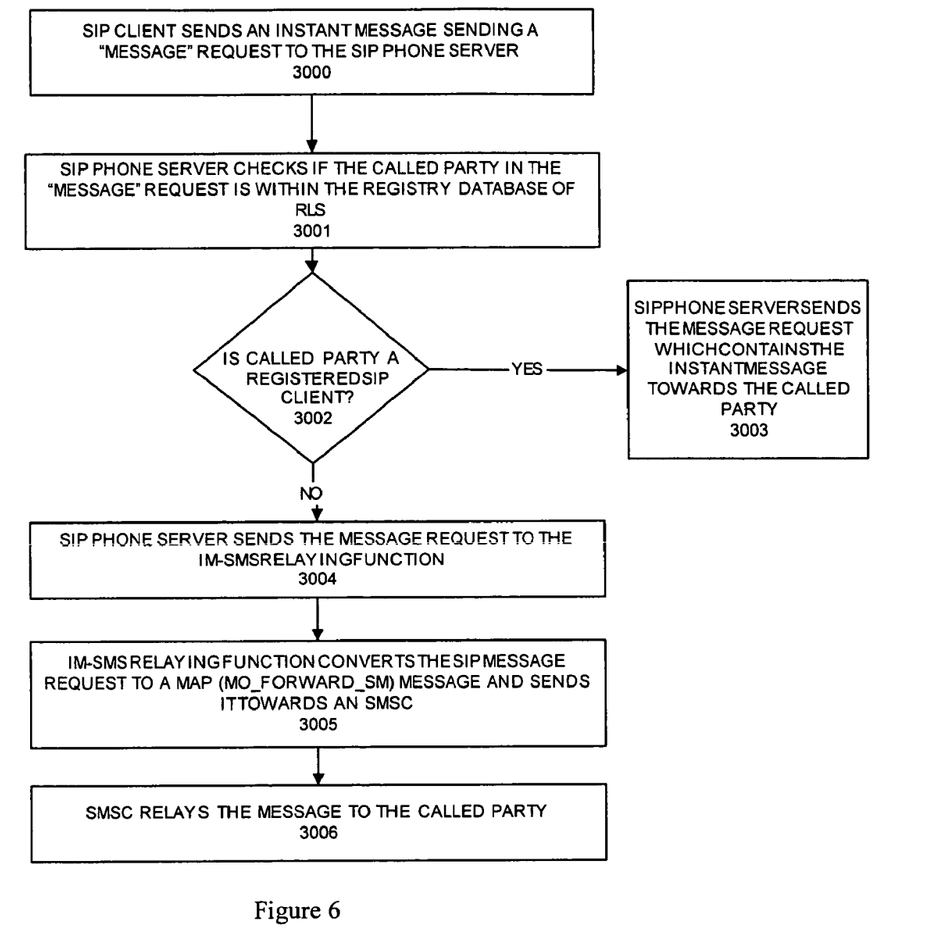
FIG. 6 illustrates a flow chart showing the SIP Client to Mobile Client SMS Flow, as per the present invention.

SIP Client Sending an Instant Message to a Mobile Number Scenario:

FIG. 6 shows a flow chart illustrating the steps performed when SIP client sends an Instant Message (IM) towards a called party. In step 3000, SIP client 104 sends an IM towards called party. Steps 3001 and 3002 are similar to steps 2001 and 2002 in FIG. 4, in that, the SPSF 901 parses the message and sends it to the RLS 913 to check if the called party is a registered SIP client also. If the called party is also a SIP client, then in step 3003, the MESSAGE request gets forwarded to the called party by the SIP Phone Server 901. Otherwise, in step 3004, the SIP Phone Server sends the MESSAGE request to the IM-SMS Relaying Function which in turn maps the MESSAGE request into a MAP message (MOForwardSM) and sends it towards the Short Message Service Center (SMSC) which is attached to the VLR/MSC in step 2005.

Although it is not shown explicitly in the flow-charts, the SIP2 Mobile Gateway processes calls that originate from a mobile client destined towards the SIP client, or an SMS message that originates from the mobile client destined towards the SIP client. In this reverse direction, the process is very similar to what is described so far with the exception that the SIP client is proxied by the SIP2 Mobile Gateway. Meaning, the SIP2 Mobile Gateway is the last mobile end point for any message or phone call sent to the SIP Client. Once the SIP2 Mobile Gateway receives the SMS or the phone call as the final mobile end point, it performs the appropriate protocol and bearer mappings and forwards them to the SIP Client.

CONCLUSION

A system and method has been shown in the above embodiments for the effective implementation of a SIP2 Mobile Gateway. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

We claim:

1. A gateway processing a phone call between a user of an IP client and another user attached to a mobile network wherein said user of said IP client subscribes to mobile services provided by a mobile service provider, said gateway implemented using computer readable code stored in a non-transitory storage, said software adjunct to a traditional softswitch, said storage storing:

computer readable program code to implement said gateway's processing, said computer readable program code comprising:

computer readable program code implementing an IP Phone server software component receiving registration and signaling messages from said IP client originating said phone call;

computer readable program code implementing a Mobility Control software component updating a home location register (HLR) to indicate the location of said IP client; and computer readable program code implementing a Service Control and Call Control software component handling said phone call originated by said IP client by directly communicating with a service control point (SCP) of said mobile network via a Visitor Location Register (VLR)/Mobile Switching Center (MSC) by sending an Intelligent Network Application Part (INAP) message to said SCP thereby making said IP client behave like a mobile client of said mobile service provider.

2. A gateway processing a phone call between a user of an IP client and another user attached to a mobile network, according to claim 1, wherein said IP client is any of the following: client embedded into a PBX, a client integrated into a web browser, a client embedded in a mobile phone, a client embedded into a personal computing device (PC) or a client embedded into a wireless handheld device.

3. A gateway processing a phone call between a user of an IP client and another user attached to a mobile network, according to claim 1, wherein said IP client is a session initiation protocol (SIP) client or H.323 client.

4. A gateway processing a phone call between a user of an IP client and another user attached to a mobile network, according to claim 1, wherein said computer readable program code implementing said mobility control software component maintains subscriber service information of said IP client retrieved during location update from said HLR.

5. A gateway processing a phone call between a user of an IP client and another user attached to a mobile network, according to claim 4, wherein said subscriber service information retrieved during location update from HLR is further merged with subscriber service information stored in said IP Phone Server.

6. A gateway processing a phone call between a user of an IP client and another user attached to a mobile network, according to claim 1, wherein said IP client uses the same telephone number as a user's cellular phone.

7. A gateway processing a phone call between a user of an IP client and another user attached to a mobile network, according to claim 6, wherein said IP client authenticates said user during registration by at least checking said telephone number and a password and starts billing when a phone call begins.

8. A gateway processing a phone call between a user of an IP client and another user attached to a mobile network, according to claim 1, wherein said IP client uses a different telephone number assigned by said mobile service provider to said IP client wherein said different telephone number is associated with a user's cell phone number.

9. A gateway processing a phone call between a user of an IP client and another user attached to a mobile network, according to claim 1, wherein said IP phone server is a Session Initiation Protocol (SIP) proxy server or SIP redirect server or an H.323 gatekeeper.

10. A gateway processing a phone call between a user of an IP client and another user attached to a mobile network, according to claim 1, wherein said IP phone server has access to subscriber service data.

11. A gateway processing a phone call between a user of an IP client and another user attached to a mobile network, according to claim 1, wherein said gateway performs optional functions, said optional functions implemented by computer readable program code in said storage comprising:
  computer readable program code converting received SIP signaling messages to SS7 ISUP signaling protocol and sending said messages to the mobile network and vice-versa;
  computer readable program code converting received VoIP bearers and converting said VoIP bearers to circuit switched voice and sending said switched voice to the mobile network;
  computer readable program code converting said received circuit switched voice and converting said circuit switched voice into VoIP bearers;
  computer readable program code invoking Media Gateway Control Protocol (MGCP) or Media Gateway Control (MEGACO) protocol messages towards a media gateway to control assignment of VoIP bearers to ports; and
  computer readable program code performing call control functions.

12. A gateway processing a phone call between a user of an IP client and another user attached to a mobile network, according to claim 1, wherein said gateway communicates with a billing system.

13. A gateway processing a phone call between a user of an IP client and another user attached to a mobile network, according to claim 1, wherein location data of said IP client is obtained from register, location and services database for subscriber location and not HLR.

14. A gateway processing a phone call between a user of an IP client and another user attached to a mobile network, according to claim 1, wherein said gateway is used for sending short messages and multimedia messages by using a IM to SMS relaying component that maps said short or said multimedia message into a Mobile Application Part (MAP) message and sends it to a message service center, attached to said VLR/MSC of said mobile network.

15. A system facilitating direct communication between IP clients and components of a mobile network to provide seamless services to said IP clients, said system comprising:
  at least one of said IP clients initiating a call to at least one mobile client via a gateway; and
  said gateway receiving said call and handling said call by directly communicating with a service control point (SCP) of said mobile network via a Visitor Location Register(VLR)/Mobile Switching Center (MSC) by sending an Intelligent Network Application Part (INAP) message to said SCP thereby making said IP client behave like a mobile client of a mobile service provider to which said IP client subscribes.

16. A system facilitating direct communication between IP clients and components of a mobile network to provide seamless services to said IP clients, as per claim 15, wherein said IP client is any of the following: client embedded into a PBX, a client integrated into a web browser, a client embedded in a mobile phone, a client embedded into a personal computing device (PC) or a client embedded into a wireless handheld device.

17. A system facilitating direct communication between IP clients and components of a mobile network to provide seamless services to said IP clients, as per claim 15, wherein said IP client is a session initiation protocol (SIP) client or H.323 client.

18. A system facilitating direct communication between IP clients and components of a mobile network to provide seamless services to said IP clients, as per claim 15, wherein said gateway is used for sending short messages and multimedia messages by using a IM to SMS relaying component that maps said short or said multimedia message into a Mobile Application Part (MAP) message and sends it to a message service center, attached to said VLR/MSC of said mobile network.

* * * * *